United States Patent
Ito

(10) Patent No.: US 7,528,209 B2
(45) Date of Patent: May 5, 2009

(54) CURABLE SILICONE RELEASE COMPOSITION AND SHEET HAVING A RELEASABILITY USING THE SAME

(75) Inventor: Hideyuki Ito, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 274 days.

(21) Appl. No.: 11/258,927

(22) Filed: Oct. 27, 2005

(65) Prior Publication Data

US 2006/0093835 A1 May 4, 2006

(30) Foreign Application Priority Data

Oct. 29, 2004 (JP) .......................... P.2004-314973

(51) Int. Cl.
*C08G 77/12* (2006.01)
*D21H 19/32* (2006.01)

(52) U.S. Cl. ........................................ 528/31; 524/861

(58) Field of Classification Search ................ 524/861, 524/862, 866; 525/478; 428/447
See application file for complete search history.

(56) References Cited

U.S. PATENT DOCUMENTS

| | | | | |
|---|---|---|---|---|
| 3,884,866 A | * | 5/1975 | Jeram et al. | 523/203 |
| 3,974,122 A | * | 8/1976 | Sato et al. | 524/500 |
| 4,025,485 A | * | 5/1977 | Kodama et al. | 524/729 |
| 4,151,344 A | * | 4/1979 | Doss et al. | 528/34 |
| 4,163,081 A | * | 7/1979 | Schulz | 428/429 |
| 4,544,692 A | * | 10/1985 | Kuziemka | 524/361 |
| 4,609,574 A | | 9/1986 | Keryk et al. | |
| 4,772,515 A | * | 9/1988 | Hara et al. | 428/447 |
| 4,845,164 A | * | 7/1989 | Gutek | 528/15 |
| 4,874,547 A | * | 10/1989 | Narula | 516/76 |
| 4,990,560 A | * | 2/1991 | Ikeno et al. | 524/731 |
| 5,082,894 A | * | 1/1992 | VanWert et al. | 524/730 |
| 5,104,919 A | * | 4/1992 | Okami et al. | 524/94 |
| 5,494,979 A | * | 2/1996 | Ebbrecht et al. | 525/479 |
| 5,520,978 A | * | 5/1996 | Boardman et al. | 428/41.9 |
| 5,571,853 A | * | 11/1996 | Ikeno et al. | 524/268 |
| 5,574,073 A | * | 11/1996 | Juen et al. | 521/134 |
| 5,599,894 A | * | 2/1997 | Ikeno | 528/15 |
| 5,607,774 A | * | 3/1997 | Dahlquist et al. | 428/447 |
| 5,922,470 A | * | 7/1999 | Bracken et al. | 428/447 |
| 5,942,591 A | | 8/1999 | Itoh et al. | |
| 6,057,042 A | * | 5/2000 | Shimotsu | 428/451 |
| 6,080,489 A | * | 6/2000 | Mehta | 428/447 |
| 6,425,600 B1 | * | 7/2002 | Fujiki et al. | 280/728.1 |
| 6,465,107 B1 | * | 10/2002 | Kelly | 428/447 |
| 6,559,246 B2 | * | 5/2003 | Kuroda et al. | 525/478 |
| 6,696,161 B2 | * | 2/2004 | Irifune et al. | 428/447 |
| 2005/0164017 A1 | * | 7/2005 | Irifune | 428/447 |
| 2006/0128921 A1 | * | 6/2006 | Cray et al. | 528/31 |
| 2006/0276599 A1 | * | 12/2006 | DeWitt et al. | 525/440 |

FOREIGN PATENT DOCUMENTS

| | | |
|---|---|---|
| GB | 1374792 | 11/1974 |
| JP | 52-47485 | 12/1977 |
| JP | 3-19268 B2 | 3/1991 |
| JP | 5-23308 B2 | 4/1993 |

* cited by examiner

*Primary Examiner*—Randy Gulakowski
*Assistant Examiner*—Robert Loewe
(74) *Attorney, Agent, or Firm*—Birch, Stewart, Kolasch & Birch, LLP

(57) ABSTRACT

A curable silicone composition which comprises (A) a diorganopolysiloxane which has a viscosity of about 50 to 500 mPa·s at 25° C. and has silicon-bonded alkenyl groups only at the molecular chain ends, (B) a diorganopolysiloxane which has a viscosity of about 50,000 to 500,000 mPa·s at 25° C. and has silicon-bonded alkenyl groups only at the molecular chain ends, (C) an organohydrogenpolysiloxane which has at least eight silicon-bonded hydrogen atoms per molecule and has a viscosity of about 3 to 15 mPa·s at 25° C., and (D) a catalytic amount of a platinum-group metal catalyst as essential components, wherein said composition has a viscosity of about 100 to 1,000 mPa·s at 25° C.; and a sheet having a releasability comprising a cured coating film of the composition.

4 Claims, No Drawings

CURABLE SILICONE RELEASE COMPOSITION AND SHEET HAVING A RELEASABILITY USING THE SAME

FIELD OF THE INVENTION

The present invention relates to a solvent-free addition-reaction-type silicone composition (release agent) which is excellent in applicability as a thin and uniform film, low-temperature curability, and adhesion to substrates and gives a cured silicone coating film having releasability, which is satisfactorily free from silicone oil migration, and has excellent slip properties and satisfactory releasability; and to a sheet having a releasability comprising a cured coating film of the composition.

BACKGROUND OF THE INVENTION

Conventionally, it has been conducted to form a cured coating film of silicone composition on the surface of the substrate such as, paper or a plastic film to impart releasing properties thereto, for the purpose of preventing adhesive substance from adhering or fixing to the substrate.

In this case, examples of the methods for forming a silicone coating film on the surface of the substrate include:

(1) a method in which an organopolysiloxane having aliphatic unsaturated groups is subjected to an addition reaction with an organohydrogenpolysiloxane by using a platinum-group compound as a catalyst to form a release coating film;

(2) a method in which an organopolysiloxane is subjected to a condensation reaction by using an organic acid metal salt catalyst such as an organotin compound to form a release coating film;

(3) a method in which a composition comprising an organopolysiloxane having acryl groups and a photoreaction initiator is irradiated with ultraviolet to form a release coating film; and (4) a method in which an organopolysiloxane having acryl groups is irradiated with electron beams to form a release coating film. Further, the types are classified into the solvent-type which is a solution in an organic solvent such as toluene; the emulsion-type prepared by emulsifying a silicone; and the solvent-free-type which does not substantially contain organic solvent.

Among those methods for forming a silicone coating film, the addition-reaction-type method (1), which is capable of satisfying various releasability required in low-speed peeling and high-speed peeling, is widely used. In addition, from the standpoints of safety, hygiene and the like, the solvent-free-type composition has been replacing the solvent-type composition recently. Furthermore, a solvent-free-type composition having a lower viscosity is desired because high-speed application is required from the aspect of productivity and from the standpoints of leveling properties and avoiding misting.

Moreover, for the high-gloss labels requiring a higher-grade feeling as well as excellent releasing properties, silicone coating film is required to be formed at a lower temperature and to have satisfactory adhesion to the substrate, from the standpoint of preventing the polyethylene-laminated fine paper used as a substrate from thermal degradation to cause reduced surface smoothness. It is not preferable to increase the amount of an expensive platinum catalyst for improving the low-temperature curability because it results in a cost increase. Furthermore, the composition is desired to be free from silicone migration from the standpoint of preventing the occurrence of printing failures in label surface printing. Simultaneously, impartation of slip properties to the surface of the cured silicone coating film is required for the purpose of preventing the running failures in printers.

As the solvent-free-type composition containing no organic solvent, a composition comprising (a) a diorganopolysiloxane having vinyl groups and having a viscosity of 50 to 4,000 mPa·s at 25° C., (b) an organohydrogenpolysiloxane having at least three silicon-bonded hydrogen atoms per molecule, (c) a platinum catalyst, and (d) an activation inhibitor is disclosed in JP-B-52-47485 (Document 1; the term "JP-B" as used herein means "examined Japanese patent application"). However, this composition not only gives a cured coating film having no slip properties but has poor low-temperature curability. In JP-B-5-23308 (Document 2), a solvent-free-type composition in which the proportion of higher alkenyl groups in the unsaturated groups has been regulated to 50% or more so as to improve low-temperature curability is proposed. However, this composition also gives a cured coating film having no slip properties. On the other hand, as the method for imparting slip properties to a solvent-free-type composition, a method in which a high-molecular organopolysiloxane having a hydroxyl group bonded to the silicon atom located at a molecular chain end is added in addition to an diorganopolysiloxane having vinyl groups and an organohydrogenpolysiloxane is proposed in JP-B-3-19268 (Document 3). However, according to the above method, migration of silicone becomes problematic because the reaction of the silicon-bonded hydroxyl groups in the high-molecular organopolysiloxane with the hydrogen atoms bonded to the remaining silicon atoms in the network is not apt to proceed under low-temperature curing conditions.

As described above, it has been difficult to obtain a solvent-free addition-reaction-type release composition which satisfies all the performance requirements shown above, as achieved by the present invention, without increasing the amount of a platinum catalyst.

Document 1 : JP-B-52-47485
Document 2 : JP-B-5-23308
Document 3 : JP-B-3-19268

SUMMARY OF THE INVENTION

The present invention was achieved under those circumstances. An object of the invention is to provide a solvent-free addition-reaction-type silicone composition (release agent) which is excellent in applicability as a thin and uniform film, low-temperature curability, and adhesion to substrates and gives a cured silicone coating film having releasability, which is satisfactorily free from silicone oil migration, and has excellent slip properties and satisfactory releasability; and to a sheet having a releasability comprising a cured coating film of the composition.

In order to accomplish the above object, the present inventors made extensive investigations on alkenyl-containing organopolysiloxanes as the main component and organohydrogenpolysiloxanes to be subjected to hydrosilylation reaction. As a result, it was found that slip properties can be imparted with keeping the low silicone migration, by using as a base a low-viscosity diorganopolysiloxane having a branched structure and having alkenyl groups only at the molecular chain ends and further using in combination therewith a high-viscosity diorganopolysiloxane having alkenyl groups only at the molecular chain ends. Furthermore, it was found that use of a low-molecular organohydrogenpolysiloxane in which each of the silicon atoms in the side chains of the molecule has hydrogen atoms as a crosslinking agent is advantageous for forming a cured silicone coating film at low temperature without reducing adhesion to substrates, which makes it possible to provide an addition-reaction solvent-type release agent with the desired releasability. Thus, the present invention was achieved.

Namely, the present invention provides the following (1) to (5).

(1) A curable silicone composition which comprises:

(A) 100 parts by weight of a diorganopolysiloxane represented by the following formula (1):

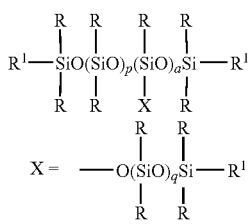

(1)

wherein $R^1$'s each represent an alkenyl group; R's may be the same or different, each represent a monovalent hydrocarbon group having no aliphatic unsaturated bond; p and q each are 0 or a positive integer, and p+q satisfies $35 \leq p+q \leq 350$; and a is an integer satisfying $1 \leq a \leq 6$, said diorganopolysiloxane having a viscosity of about 50 to 500 mPa·s at 25° C. and having silicon-bonded alkenyl groups only at the molecular chain ends;

(B) about 3.0 to 15.0 parts by weight of a diorganopolysiloxane represented by the following formula (2):

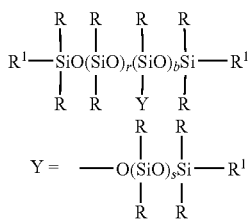

(2)

wherein $R^1$'s each represent an alkenyl group; R's may be the same or different, each represent a monovalent hydrocarbon group having no aliphatic unsaturated bond; r and s each are 0 or a positive integer, and r+s satisfies $1,000 \leq r+s \leq 3,000$; and b is 0 or 1, said diorganopolysiloxane having a viscosity of about 50,000 to 500,000 mPa·s at 25° C. and having silicon-bonded alkenyl groups only at the molecular chain ends;

(C) about 1.0 to 10.0 parts by weight of an organohydrogenpolysiloxane having at least eight silicon-bonded hydrogen atoms per molecule and having a viscosity of about 3 to 15 mPa·s at 25° C.; and (D) a catalytic amount of a platinum-group metal catalyst, wherein said composition has a viscosity of about 100 to 1,000 mPa·s at 25° C.

(2) The curable silicone composition according to (1), wherein said organohydrogenpolysiloxane (C) is represented by the following formula (3):

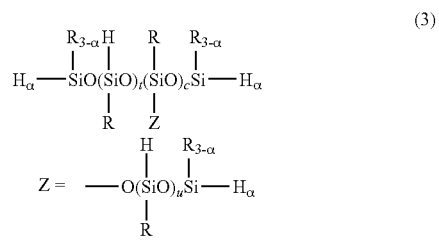

(3)

wherein H represents a hydrogen atom; R's may be the same or different, each represent a monovalent hydrocarbon group having no aliphatic unsaturated bond; t and u each are 0 or a positive integer, and t+u satisfies $8 \leq t+u \leq 25$; c is 0 or 1; and $\alpha$ is 0 or 1.

(3) The curable silicone composition according to (1), which does not substantially contain an organic solvent.

(4) The curable silicone composition according to (2), which does not substantially contain an organic solvent.

(5) A sheet having a releasability, which comprises a substrate and a cured coating film of said composition according to any one of claims 1 to 4.

The above silicone composition was found to provide a release liner, and thus, the present invention has been achieved.

According to the present invention, glossy label having a high-grade feeling can be produced; printing failures caused by silicone migration can be prevented; and an occurrence of running failures in printers can be prevented.

DETAILED DESCRIPTION OF THE INVENTION

The present invention will be explained below in more detail.

According to the present invention, "solvent-free type" composition means the composition which does not substantially containing an organic solvent. The amount of the organic solvent in the composition is preferably 1,000 ppm or less, more preferably, 200 ppm or less.

In the present invention, the values of the viscosity are those measured by using the rotational viscometer (B-type viscometer) at 25° C.

Furthermore, unless otherwise indicated, all parts, percentages, ratios and the like used in this specification are by weight, which are the same with those by mass, respectively.

For the purpose of improving curability and improving releasability, the organopolysiloxane as ingredient (A) in the present invention has one to six branches per molecule on the average and has silicon-bonded alkenyl groups $R^1$'s only at the molecular chain ends, as shown in formula (1). $R^1$ is an alkenyl group having 1 to 10 carbon atoms, and examples thereof include vinyl, allyl, propenyl, hexenyl, octenyl, and decenyl. From the standpoints of cost and curability, vinyl and hexenyl are preferable.

R's may be the same or different, each represent a monovalent hydrocarbon group which contains no aliphatic unsaturated bond and has 1 to 12, preferably 1 to 6 carbon atoms. Examples thereof include alkyl groups such as methyl, ethyl, and propyl and aryl groups such as phenyl and tolyl. From the standpoint of improving curability and releasability, it is preferable that at least 80% by mole of the R's are methyl. Symbol "a" is an integer satisfying $1 \leq a \leq 6$. When "a" is 0, i.e., the molecule is linear, satisfactory curability at low-temperature is not obtained. When "a" exceeds 6, synthesis is difficult and the silicone composition has a reduced stability (pot life) as well as a reduced release performance. Consequently, one of the intended advantages of the invention may not be achieved.

When the viscosity thereof as measured at 25° C. is lower than 50 mPa·s, a trouble that the amount of infiltration into substrate is increased may occur, and additionally, the release performance may be deteriorated. When the viscosity thereof is higher than 500 mPa·s, applicability may be reduced to cause a problem that misting occurs in the high-speed application. Therefore, the degree of polymerization "p+q" should be in the range of 35 to 350. (Herein, symbol "p" and "q" each are 0 or a positive integer.)

The diorganopolysiloxane as ingredient (B) in the present invention is an ingredient which contributes to the impartation of slip properties. As shown in formula (2), it has silicon-bonded alkenyl groups only at the ends of the molecular chain. Since ingredient (B) has a far higher viscosity than ingredient (A), it is apt to localize in the surface of the cured coating film (blooming), and the slip properties can hence be imparted. Furthermore, since the diorganopolysiloxane has alkenyl groups and hence undergoes an addition reaction to form chemical bonds in the cured coating film, silicone migration can be prevented. In this regard, ingredient (B) has silicon-bonded alkenyl groups each represented by $R^1$. Examples of the alkenyl groups $R^1$ include the same alkenyl groups shown above, and specific examples thereof include vinyl, allyl, propenyl, hexenyl, octenyl, and decenyl.

Examples of the monovalent hydrocarbon groups containing no aliphatic unsaturated bond, which are represented by R's and may be the same or different, include the same groups as shown above, and specific examples thereof include alkyl groups such as methyl, ethyl, and propyl and aryl groups such as phenyl and tolyl. From the standpoint of improving curability and releasability, it is preferable that at least 80% by mole of the R's are methyl. Symbol "b" is 0 or 1. Namely, the molecule may be either liner or branched. However, when "b" is 2 or larger, synthesis of the compound is difficult and thus not preferable. Furthermore, when the viscosity of ingredient (B) as measured at 25° C. is lower than 50,000 mPa·s, the impartation of slip properties is reduced, and when the viscosity thereof exceeds 500,000 mPa·s, silicone migration is apt to occur. Therefore, the degree of polymerization "r+s" should be in the range of 1,000 to 3,000. (Herein, symbol "r" and "s" each are 0 or a positive integer.)

Further, the amount of ingredient (B) to be incorporated is about 3.0 to 15.0 parts by weight per 100 parts by weight of ingredient (A). When the amount of ingredient (B) is smaller than 3.0 parts by weight, impartation of slip properties may be reduced. When the amount thereof is larger than 15.0 parts by weight, the amount of silicone migration may be increased and the viscosity of the-composition may be increased to lower the applicability. Preferably, the amount thereof may be in the range of 4.0 to 10.0 parts by weight.

The organohydrogenpolysiloxane as ingredient (C) in the present invention is an ingredient which undergoes addition reactions with the alkenyl groups in ingredients (A) and (B) to form a cured coating film. As the structure satisfying both of low-temperature curability and adhesion to substrates, ingredient (C) desirably has a structure which comprises $HRSiO_{2/2}$ units in which all the silicon atoms in the side chains of the molecule each have one hydrogen atom, and contains no $R_2SiO_{2/2}$ unit. When $R_2SiO_{2/2}$ units are contained, adhesion to substrates is considerably reduced, although the low-temperature curability is improved. Therefore, the number of $R_2SiO_{2/2}$ units per molecule is preferably 2 or smaller.

The organohydrogenpolysiloxane (C) is preferably represented by the following formula (3);

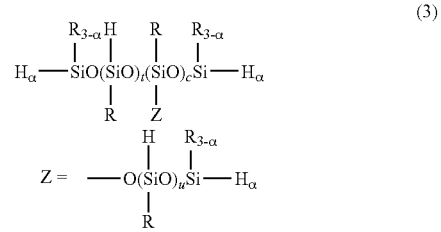

In formula (3), H is a hydrogen atom; R's are the same or different, each represent a monovalent hydrocarbon group containing no aliphatic unsaturated bond; t and u each represent 0 or a positive integer and t+u satisfies $8 \leq t+u \leq 25$; c is 0 or 1; and α is 0 or 1.

Examples of the monovalent hydrocarbon groups containing no aliphatic unsaturated bond, which are represented by R's and may be the same or different, include the same groups as shown above, and specific examples thereof include alkyl groups such as methyl, ethyl, and propyl and aryl groups such as phenyl and tolyl. From the standpoint of improving curability and releasability, it is preferable that at least 80% by mole of the R's are methyl.

The degree of polymerization t+u is preferably in the range of 8 to 25. (Herein, symbol "t" and "u" each are 0 or a positive integer.) When the degree of polymerization is lower than 8, volatile content is increased and adhesion to substrates is considerably deteriorated. On the other hand, when the degree of polymerization exceeds 25, excellent low-temperature curability may not be obtained. Therefore, the viscosity thereof as measured at 25° C. may be regulated so as to be in the range of about 3 to 15 mPa·s.

The molecular ends may be either hydrogen atoms or the R's described above. However, when t+u is close to 8, hydrogen atoms is more preferable from the standpoint of adhesion to substrates.

Symbol "c" is 0 or 1. Namely, the molecule may be either linear or branched. However, when "c" is 2 or larger, it is not preferable because pot life and adhesion to substrates are deteriorated.

The amount of ingredient (C) to be incorporated is regulated according to the total amount of alkenyl groups in ingredients (A) and (B) and the amount of SiH groups in ingredient (C). It is preferable that the molar proportion of the alkenyl groups to the SiH groups be in the range of 0.9 to 5.0. In this case, it may be attained by incorporating ingredient (C) in an amount of about 1.0 to 10.0 parts by weight per 100 parts by weight of ingredient (A).

The reasons for the above-described ingredient (C) amount regulation are as follows. When the molar proportion of the alkenyl groups to the SiH groups is lower than 0.9, curability may become poor and the property of less undergoing silicone migration may be deteriorated. When the proportion thereof exceeds 5.0, slip properties and releasability may be reduced. In either case, all of the effects of the invention may not be obtained. Preferably, the proportion thereof is in the range of 1.0 to 3.0.

The platinum-group metal catalyst as ingredient (D) is a catalyst for accelerating the addition reaction of ingredients (A) and (B) with ingredient (C), and a conventional addition-reaction catalyst can be used as ingredient (D). Examples of the platinum-group metal catalyst include metal catalysts such as platinum catalyst, palladium catalyst, and rhodium catalyst, and platinum catalyst is especially preferable.

Examples of the platinum catalyst include chloroplatinic acid, alcohol or aldehyde solutions of chloroplatinic acid, and complexes of chloroplatinic acid with various types of olefins or vinylsiloxanes.

The platinum-group metal catalyst is added in a catalytic amount. However, from the standpoints of obtaining a satisfactory cured coating film and of economical efficiency, the amount of the catalyst is preferably in the range of about 1 to 1,000 weight ppm, more preferably in the range of 1 to 500 weight ppm, with respect to 100 parts by weight of the sum of ingredients (A), (B), and (C), in terms of platinum-group metal amount.

The composition of the present invention is obtainable by mixing given amounts of ingredients (A) to (D) described above. However, optional ingredients may be added besides the above ingredients according to the necessity. For example, activation inhibitors such as various organic nitrogen compounds, organophosphorus compounds, acetylene compounds, oxime compounds, and organochlorine compounds may be added for the purpose of inhibiting the catalytic activity of the platinum-group metal catalyst. Such optional ingredients can be added in an ordinary amount as long as the addition thereof does not hinder the effects of the present invention. Furthermore, ingredients outside the specified ranges of ingredients (A) to (C) may be optionally added in an ordinary amount as long as this addition does not hinder the effects of the present invention.

With regard to the preparation of the silicone composition of the present invention, it is preferable that ingredients (A) to (C) and optional ingredients be homogeneously mixed together beforehand and ingredient (D) be added to the reaction mixture. Each ingredient may be used solely or may be used by a combination of two or more kinds. However, it is preferable that the composition as a whole is regulated so as to have a viscosity as measured at 25° C. in the range of 100 to 1,000 mPa·s. When the viscosity thereof exceeds 1,000 mPa·s, high-speed application is impossible because of the generation of misting at the space between the coating rolls during the application. Accordingly, it is difficult to use the composition practically, since the productivity is deteriorated.

The sheet having a releasability provided by the present invention will be explained below with respect to an example of processes for producing the same. However, the sheet having a releasability of the present invention is not limited to those produced by the following process, and other production processes in ordinary use may be employed.

Examples of the substrate on which the composition of the present invention is applied to form a cured coating film include paper substrates such as glassine paper, kraft paper, and clay-coated paper; laminated papers such as polyethylene-laminated fine paper and polyethylene-laminated kraft paper; sheets (including films) obtainable from synthetic resins such as polyester, polypropylene, polyethylene, polyvinyl chloride, polytetrafluoroethylene, and polyimide; and metal foils such as aluminum foil. Especially, it is preferable to use a paper substrate or a laminated paper in view of the excellent adhesiveness to the coating film.

For applying the composition of the present invention to the substrate, conventional methods such as coating with a gravure-offset three-roll coater or coating with a multi-stage roll coater comprising, e.g., five or six rolls may be used. The amount of the composition to be applied is preferably in the range of 0.05 to 5.0 $g/m^2$, especially 0.1 to 3.0 $g/m^2$. The composition may be applied to the whole surface of the substrate or the part required to have the releasing properties. After being applied to the substrate, the composition is cured, for example, by heating at 70 to 220° C. for 1.5 to 60 seconds to thereby obtain the sheet having a releasability of the present invention.

The present invention will be explained below in more detail by the following Examples and Comparative Examples, but the present invention is not limited by the following Examples. In the Examples and Comparative Examples, all "parts" are by weight and the viscosity values were obtained through measurements at 25° C.

Further, silicone compositions were examined for curability, adhesion, peel force, subsequent adhesion, prevention of silicone migration, and slip properties by the following methods.

(Curability)

Each silicone composition is applied in a given amount on the surface of the substrate in the form of a thin film or sheet and heated in a hot-air drying oven at a given temperature. The cured coating film which is formed on the surface of the substrate is rubbed with a finger several times. The time period (number of seconds) required for the coating film to become free from fogging and peeling is measured and this period is used as the curability.

(Adhesion)

Each silicone composition is applied in a given amount on the surface of the substrate in the form of a thin film or sheet and heated for a given period in a hot-air drying oven at a given temperature to thereby form a cured coating film. Thereafter, the coated substrate is stored for 5 days and for 10 days in an atmosphere having a temperature of 25° C. and a humidity of 70%. Subsequently, the cured silicone coating film is rubbed with a finger forward and backward 10 times and then evaluated for peeling.

No peeling occurred: A

Peeling occurred: B (Peel Force)

Each silicone composition is applied in a given amount on the surface of the substrate in the form of a thin film or sheet and heated for a given period in a hot-air drying oven at a given temperature to thereby form a cured coating film. Thereafter, the coated substrate is subjected to an aging with a separator at 25° C. for 24 hours. Acrylic solvent-based pressure-sensitive adhesive Oribain BPS-5127 (trade name; manufactured by Toyo Ink Mfg. Co., Ltd.) is then applied to the surface of the cured coating film in a thickness of 130 μm on a wet basis and heat-treated at 100° C. for 3 minutes. Subsequently, fine paper having a basis weight of 64 $g/m^2$ is laminated to the treated surface and this structure is subjected to an aging at 25° C. for 20 hours. Thereafter, the resultant sample is cut into a width of 50 mm. The paper laminated is then pulled away at an angle of 180° and a peeling rate of 0.3 m/min with tensile tester Type DSC-500 (manufactured by Shimadzu Corporation), to measure the force (N) required for the peeling (peel force).

(Subsequent Adhesion)

A cured coating film of each silicone composition is formed on a substrate surface in the same manner as in the peel force measurement. A polyester tape (trade name, No. 31B Tape; manufactured by Nitto Denko Corporation) is applied to the surface of the cured coating film. A load of 1.96 kPa is imposed thereon, and subsequently subjected to an aging at 70° C. for 20 hours. Thereafter, the tape is stripped off and applied to a stainless-steel plate. Subsequently, the applied tape is peeled from the stainless-steel plate at an angle of 180° and a peeling rate of 0.3 m/min to measure the force A (N) required for the peeling. On the other hand, a blank test is conducted in which the polyester tape is applied to a Teflon (trademark of E.I. du Pont de Nemours and Co.) plate, treated in the same manner, and then examined for the force B (N) required for peeling from a stainless-steel plate. The value of (A/B)×100 is defined as the subsequent adhesion (%)

(Prevention of Silicone Migration)

A cured coating film of each silicone composition is formed on a substrate surface in the same manner as in the peel force measurement. A PET film having a thickness of 36 μm is superposed on the surface of the cured coating film, and subsequently pressed at 0.98 MPa for 20 hours at room temperature. Thereafter, an oil-based ink (trade name: Magic Ink; manufactured by Teranishi Chemical Industry Co., Ltd.) is applied to the side of the PET film being in contact with the silicone-coated surface, and the degree of rejecting of the ink is examined to evaluate the prevention of silicone oil migration based on the following criteria.

No ink rejection occurred: A

Ink rejection occurred: B (Slip Properties)

A neoprene/butadiene rubber (NBR) having a size of 20 mm×20 mm×2 mm is applied to the bottom surface of a weight having a weight of 200 g. This weight is placed on the surface of a cured coating film formed from each silicone composition on a substrate surface in the same manner as in the peel force measurement. The weight is pulled in a horizontal direction at a rate of 0.3 m/min with the same tensile tester to measure the force C (N) at the time when the weight being pulled is in a stable state.

Slip properties are evaluated in terms of the value of the coefficient of dynamic friction: C/(200×0.0098).

EXAMPLE 1

To 100 parts of a branched dimethylpolysiloxane as ingredient (A) represented by the following formula (4) and the average empirical formula (A-1) indicated in Table 1 and having a viscosity of 280 mPa·s, in which each of the molecular chain ends is blocked with a dimethylvinylsiloxy group, were added 6.9 parts of a dimethylpolysiloxane as ingredient (B) represented by the following formula (4) and the average empirical formula (B-1) indicated in Table 1 and having a viscosity of 100,000 mPa·s, in which each of the molecular chain ends is blocked with a dimethylvinylsiloxy group; 4.3 parts of a branched methylhydrogenpolysiloxane as ingredient (C) represented by the following formula (5) and the average empirical formula (C-1) indicated in Table 1 and having a viscosity of 8.5 mPa·s, in which each of the molecular chain ends is blocked with a trimethylsiloxy group [SiH/(SiCH=CH$_2$)=1.8]; 0.2 parts of 1-ethynyl-1-cyclohexanol as an optional ingredient; and 0.6 parts of 1,1-dimethylpropynyloxytrimethylsilane as another optional ingredient. This mixture was stirred until it became homogeneous. Thereafter, a platinum/vinylsiloxane complex represented by the formula Pt/[H$_2$C=C(CH$_3$)$_2$Si]$_2$O was added thereto as ingredient (D) in an amount of 100 ppm of the dimethylpolysiloxane in terms of platinum amount to thereby prepare a silicone composition having a viscosity of 392 mPa·s.

Subsequently, the silicone composition thus prepared was applied to a polyethylene-laminated fine paper (basis weight, 100 g/m$^2$) in an amount of 0.6 to 0.7 g/m$^2$. The number of seconds required for the composition to cure at 100° C. was determined in a curability test. A sample to be evaluated for adhesion was prepared by forming a cured coating film through heating at 100° C. for 15 seconds. Samples to be subjected to the other examinations were prepared by forming a cured coating film through heating at 110° C. for 15 seconds. The results of the examinations thereof are shown in Table 2.

Comparative Example 1

A silicone composition having a viscosity of 414 mPa·s was prepared in the same manner as in Example 1, except that 3.6 parts of a methylhydrogenpolysiloxane represented by the following formula (5) and the average empirical formula (C-2) indicated in Table 1 and having a viscosity of 20 mPa·s, in which each of the molecular chain ends is blocked with a trimethylsiloxy group [SiH/(SiCH=CH$_2$)=1.8] was used as ingredient (C). The same property tests as in Example 1 were conducted, and the results thus obtained are shown in Table 2.

Comparative Example 2

A silicone composition having a viscosity of 366 mPa·s was prepared in the same manner as in Example 1, except that 4.8 parts of a methylhydrogenpolysiloxane represented by the following formula (5) and the average empirical formula (C-3) indicated in Table 1 and having a viscosity of 2.5 mPa·s, in which each of the molecular chain ends is blocked with a trimethylsiloxy group [SiH/(SiCH=CH$_2$)=1.8] was used as ingredient (C). The same property tests as in Example 1 were conducted, and the results thus obtained are shown in Table 2.

Comparative Example 3

A silicone composition having a viscosity of 570 mPa·s was prepared in the same manner as in Example 1, except that a dimethylpolysiloxane represented by the following formula (4) and the average empirical formula (A-2) indicated in Table 1 and having a viscosity of 380 mPa·s, in which the each of the molecular chain ends is blocked with a dimethylvinylsiloxy group was used as ingredient (A), and that the amount of the ingredient (C) was changed to 2.4 parts [SiH/(SiCH=CH$_2$)=1.8]. The same property tests as in Example 1 were conducted, and the results thus obtained are shown in Table 2.

Comparative Example 4

A silicone composition having a viscosity of 225 mPa·s was prepared in the same manner as in Example 1, except that the ingredient (B) was not used. The same property tests as in Example 1 were conducted, and the results thus obtained are shown in Table 2.

Comparative Example 5

A silicone composition having a viscosity of 950 mPa·s was prepared in the same manner as in Example 1, except that the amount of the ingredient (B) was changed to 20 parts. The same property tests as in Example 1 were conducted, and the results thus obtained are shown in Table 2.

Comparative Example 6

A silicone composition having a viscosity of 370 mPa·s was prepared in the same manner as in Example 1, except that 6.9 parts of a methylhydrogenpolysiloxane represented by the following formula (5) and the average empirical formula (C-4) indicated in Table 1 and having a viscosity of 5.5 mPa·s [SiH/(SiCH=CH$_2$)=1.8] was used as ingredient (C). In this polysiloxane, each of the molecular chain ends is blocked with a trimethylsiloxy group, and the polysiloxane has dimethylsiloxane units in an amount of 33.3 mol %. The same property tests as in Example 1 were conducted, and the results thus obtained are shown in Table 2.

EXAMPLE 2

To 100 parts of a branched dimethylpolysiloxane as ingredient (A) represented by the following formula (4) and the average empirical formula (A-3) indicated in Table 1 and having a viscosity of 230 mPa·s, in which the molecular chain ends is blocked with a dimethylvinylsiloxy group, were added 8 parts of a dimethylpolysiloxane as ingredient (B) represented by the following formula (4) and the average empirical formula (B-2) indicated in Table 1 and having a viscosity of 80,000 mPa·s, in which each of the molecular chain ends is blocked with a dimethylvinylsiloxy group; 4.7 parts of a methylhydrogenpolysiloxane as ingredient (C) represented by the following formula (5) and the average empirical formula (C-5) indicated in Table 1 and having a viscosity of 6.6 mPa·s, in which each of the molecular chain ends is blocked with a dimethylhydrogensiloxy group [SiH/(SiCH=CH$_2$)=1.9]; 0.2 parts of 1-ethynyl-1-cyclohexanol as an optional ingredient; and 0.6 parts of 1,1-dimethylpropynyloxytrimethylsilane as another optional ingredient. This mixture was stirred until it became homogeneous. Thereafter, a platinum/vinylsiloxane complex represented by the formula Pt/[H$_2$C=C(CH$_3$)$_2$Si]$_2$O was added thereto as ingredient (D) in an amount of 100 ppm of the dimethylpolysiloxane in terms of platinum amount to thereby prepare a silicone composition having a viscosity of 370 mPa·s. The same property tests as in Example 1 were conducted, and the results thus obtained are shown in Table 2.

EXAMPLE 3

To 100 parts of a branched dimethylpolysiloxane as ingredient (A) represented by the following formula (4) and the average empirical formula (A-1) indicated in Table 1 and having a viscosity of 280 mPa·s, in which each of the molecular chain ends is blocked with a dimethylvinylsiloxy group, were added 5 parts of a branched dimethylpolysiloxane as ingredient (B) represented by the following formula (4) and the average empirical formula (B-3) indicated in Table 1 and having a viscosity of 200,000 mPa·s, in which each of the molecular chain ends is blocked with a dimethylvinylsiloxy group; 4.1 part of a methylhydrogenpolysiloxane as ingredient (C) represented by the following formula (5) and the average empirical formula (C-6) indicated in Table 1 and having a viscosity of 4.6 mPa·s, in which both molecular chain ends each had been blocked with a trimethylsiloxy group [SiH/(SiCH=CH$_2$)=1.8]; 0.2 parts of 1-ethynyl-1-cyclohexanol as an optional ingredient; and 0.6 parts of 1,1-dimethylpropynyloxytrimethylsilane as another optional ingredient. This mixture was stirred until it became homogeneous. Thereafter, a platinum/vinylsiloxane complex represented by the formula Pt/[H$_2$C=C(CH$_3$)$_2$Si]$_2$O was added thereto as ingredient (D) in an amount of 100 ppm of the dimethylpolysiloxane in terms of platinum amount to thereby prepare a silicone composition having a viscosity of 380 mPa·s. The same property tests as in Example 1 were conducted, and the results thus obtained are shown in Table 2.

$$Vi-SiO(SiO)_m(SiO)_dSi-Vi \quad (4)$$
(with Me groups and X' substituent)

$$X' = -O(SiO)_n Si-Vi$$
(with Me groups)

$$Me_{3-\beta}H\text{-}SiO(SiO)_{m'}(SiO)_e(SiO)_fSi\text{-}H_\beta Me_{3-\beta} \quad (5)$$
(with Me groups and Z' substituent)

$$Z' = -O(SiO)_{n'}Si-Me$$
(with H and Me groups)

TABLE 1

| | A-1 | A-2 | A-3 | B-1 | B-2 | B-3 |
|---|---|---|---|---|---|---|
| Average of (m + n × d) | 230 | 157 | 157 | 1,300 | 1,200 | 1,800 |
| Average of d | 4 | 0 | 1 | 0 | 0 | 1 |

| | C-1 | C-2 | C-3 | C-4 | C-5 | C-6 |
|---|---|---|---|---|---|---|
| Average of (m' + n' × e + f) | 16 | 50 | 6 | 8 | 12 | 10 |
| Average of e | 1 | 0 | 0 | 0 | 0 | 0 |
| Average of f | 0 | 0 | 0 | 4 | 0 | 0 |
| Average of β | 0 | 0 | 0 | 0 | 1 | 0 |

TABLE 2

| | Curability (sec) | Adhesion 5 days | Adhesion 10 days | Subsequent adhesion (%) | Prevention of silicone migration | Slip property | Peel force (N/50 mm) |
|---|---|---|---|---|---|---|---|
| Example 1 | 10 | A | A | 95 | A | 0.220 | 0.82 |
| Example 2 | 12 | A | A | 94 | A | 0.205 | 0.65 |
| Example 3 | 10 | A | A | 95 | A | 0.230 | 0.91 |
| Comparative Example 1 | 15 | A | A | 90 | B | 0.230 | 1.23 |
| Comparative Example 2 | 10 | A | B | 92 | A | 0.235 | 0.80 |
| Comparative Example 3 | 20 | B | B | 92 | B | 0.255 | 0.75 |

TABLE 2-continued

|  | Curability (sec) | Adhesion 5 days | Adhesion 10 days | Subsequent adhesion (%) | Prevention of silicone migration | Slip property | Peel force (N/50 mm) |
|---|---|---|---|---|---|---|---|
| Comparative Example 4 | 10 | A | A | 99 | A | 0.450 | 1.52 |
| Comparative Example 5 | 15 | A | A | 94 | B | 0.200 | 0.78 |
| Comparative Example 6 | 10 | B | B | 96 | A | 0.245 | 1.81 |

The silicone compositions of the present invention show satisfactory low-temperature curability, are excellent in applicability as a thin and uniform film and adhesion to substrates, and are solvent-free-type compositions capable of forming cured silicone coating films which are free from silicone migration and have satisfactory slip properties and excellent release performance. While the present invention has been described in detail and with reference to specific embodiments thereof, it will be apparent to one skilled in the art that various changes and modifications can be made therein without departing from the scope thereof.

This application is based on Japanese patent application No. 2004-314973 filed Oct. 29, 2004, the entire contents thereof being hereby incorporated by reference.

What is claimed is:

1. A curable silicone composition which comprises:
(A) 100 parts by weight of a diorganopolysiloxane represented by the following formula (1):

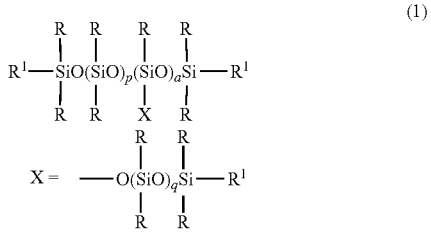

(1)

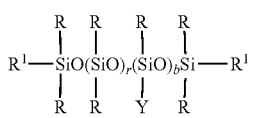

wherein $R^1$'s each represent an alkenyl group; R's may be the same or different, each represent a monovalent hydrocarbon group having no aliphatic unsaturated bond; p and q each are 0 or a positive integer, and p+q satisfies $35 \leq p+q \leq 350$; and a is an integer satisfying $1 \leq a \leq 6$,
said diorganopolysiloxane having a viscosity of about 50 to 500 mPa·s at 25° C. and having silicon-bonded alkenyl groups only at the molecular chain ends;
(B) about 3.0 to 15.0 parts by weight of a diorganopolysiloxane represented by the following formula (2):

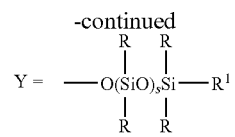

(2)

-continued

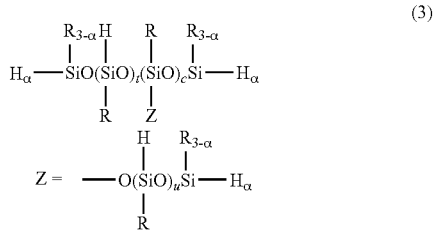

wherein $R^1$'s each represent an alkenyl group; R's may be the same or different, each represent a monovalent hydrocarbon group having no aliphatic unsaturated bond; r and s each are 0 or a positive integer, and r+s satisfies $1,000 \leq r+s \leq 3,000$; and b is 0 or 1,
said diorganopolysiloxane having a viscosity of about 50,000 to 500,000 mPa·s at 25° C. and having silicon-bonded alkenyl groups only at the molecular chain ends;
(C) about 1.0 to 10.0 parts by weight of an organohydrogenpolysiloxane having at least eight silicon-bonded hydrogen atoms per molecule and having a viscosity of about 3 to 15 mPa·s at 25° C., the organohydrogenpolysiloxane (C) being represented by the following formula (3):

$$\begin{array}{c} R_{3-\alpha}H \quad R \quad R_{3-\alpha} \\ | \quad\quad | \quad | \\ H_\alpha-SiO(SiO)_t(SiO)_cSi-H_\alpha \\ | \quad | \\ R \quad Z \end{array}$$ (3)

$$Z = -O(SiO)_u Si-H_\alpha$$ with H, $R_{3-\alpha}$, R substituents wherein H represents a hydrogen atom; R's may be the same or different, each represent a monovalent hydrocarbon group having no aliphatic unsaturated bond; t and u each are 0 or a positive integer, and t+u satisfies $8 \leq t+u \leq 25$; c is 0 or 1 wherein c is 1 when b in the formula (2) is 0; and $\alpha$ is 0 or 1; and
(D) a catalytic amount of a platinum-group metal catalyst, wherein said composition has a viscosity of about 100 to 1,000 mPa·s at 25° C.

2. The curable silicone composition according to claim 1, which does not substantially contain an organic solvent.

3. The curable silicone composition according to claim 1, which does not substantially contain an organic solvent.

4. A sheet having a releasability, which comprises a substrate and a cured coating film of said composition according to any one of claims 1 and 2 to 3.

* * * * *